United States Patent [19]

Koren

[11] Patent Number: 5,550,683
[45] Date of Patent: Aug. 27, 1996

[54] MAGNETIC RECORDING CHANNEL EMPLOYING A NON-IDEAL D.C.-FREE EQUALIZER AND A D.C.-FREE MODULATION CODE

[75] Inventor: Norman L. Koren, Encinitas, Calif.

[73] Assignee: Eastman Kodak Company, Rochester, N.Y.

[21] Appl. No.: 989,432

[22] Filed: Dec. 11, 1992

[51] Int. Cl.$^6$ .................................................. G11B 5/09
[52] U.S. Cl. ................................................ 360/46; 360/65
[58] Field of Search .......................... 360/29, 40, 42–44, 360/46, 65; 375/110, 11, 13, 113, 101, 99; 333/28 R

[56] References Cited

U.S. PATENT DOCUMENTS

| | | |
|---|---|---|
| 4,081,756 | 3/1978 | Price et al. . |
| 4,675,650 | 6/1987 | Coppersmith et al. ................ 340/347 |
| 5,166,955 | 11/1992 | Ohta ..................................... 360/65 X |
| 5,220,466 | 6/1993 | Coker et al. ............................. 360/46 |
| 5,233,482 | 8/1993 | Galbraith et al. ...................... 360/46 |

OTHER PUBLICATIONS

Tyner et al., Equalizer Performance in a Magnetic Recording Channel with Asymmetric Response, IEEE, Nov. 1991.
Koren, $(1+D)^w$ Partial Response Channel for UMR Heads, IEEE, Nov. 1993.
Kabal et al. "Partial Response Signaling", pp. 921–934, Sep. 1975.

Primary Examiner—Donald T. Hajec
Assistant Examiner—Thien Minh Le
Attorney, Agent, or Firm—William F. Noval

[57] ABSTRACT

A channel for magnetic recording systems that employs $(1+D)^n$ PR equalization, omitting the $(1-D)$ factor. PR2 $((1+D)^2)$ is the preferred embodiment of the present invention and PR1 $(1+D)$ is also of interest. The signal is equalized for a pulse response that approximates the ideal pulse response, but has zero d.c. content. An equalizer having two classes of pulse response meeting these criteria are described, each suitable for use with different types of playback heads.

40 Claims, 7 Drawing Sheets

MAGNETIC RECORDING CHANNEL EMPLOYING A NON-IDEAL D.C.-FREE EQUALIZER AND A D.C.-FREE MODULATION CODE

FIELD OF INVENTION

This invention relates to data recording and retrieval of data stored in magnetic data storage systems. In particular, the present invention provides improved linear density of data stored in systems by employing $(1+D)^n$ Partial Response (PR) equalization. The invention can be used with Maximum Likelihood (ML) detection but can also be used with other detection systems.

BACKGROUND OF THE INVENTION

Peak detectors were almost universally employed in digital magnetic recording systems prior to introduction of a disk drive employing PR4 equalization with sampling Viterbi detection by IBM in 1990. The purpose of the peak detector is to detect recorded digital data ("0"s and "1"s) as it passes the read head. In typical NRZI systems, a "1" appears as a readback pulse with a single peak and a "0" as the absence of a pulse in a predetermined time slot, or "bit cell" or "window". Since pulse peaks are somewhat indistinct by their nature, peak detectors operate by transforming peaks into zero-crossings, which are more easily detectable events. Two types of peak detector channels are in common use—namely 1) the differentiating amplitude-qualified peak detector (AQPD), and 2) the integrating detector.

Figure 1:
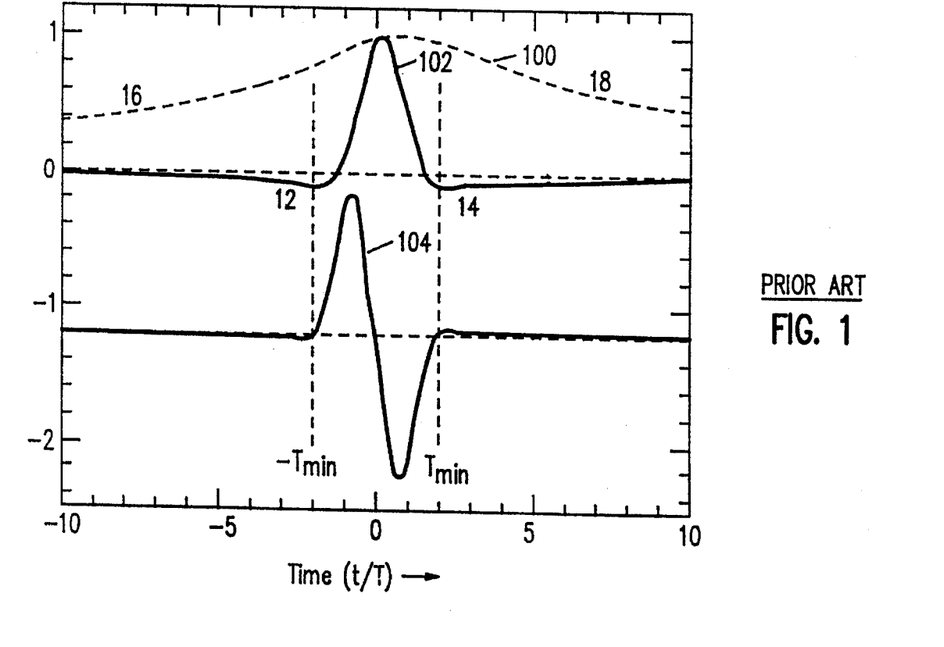
FIG. 1 illustrates prior art AQPD step responses for (1,7) code.

Referring to FIG. 1, in an AQPD, isolated pulse (or step response) 100 for an unshielded magnetoresistive (UMR) head is equalized if needed to be bounded in time, and then differentiated to provide the zero-crossing event. Equalized pulse 102 for the UMR head has gradual undershoot features 12 and 14, which is absent with inductive heads. Differentiated pulse 104 provides the desired zero-crossing event. Most of the equalized pulse energy is in the $\{-T_{min}, T_{min}\}$ interval, where $T_{min}$ is the minimum time between transitions.

Figure 2:
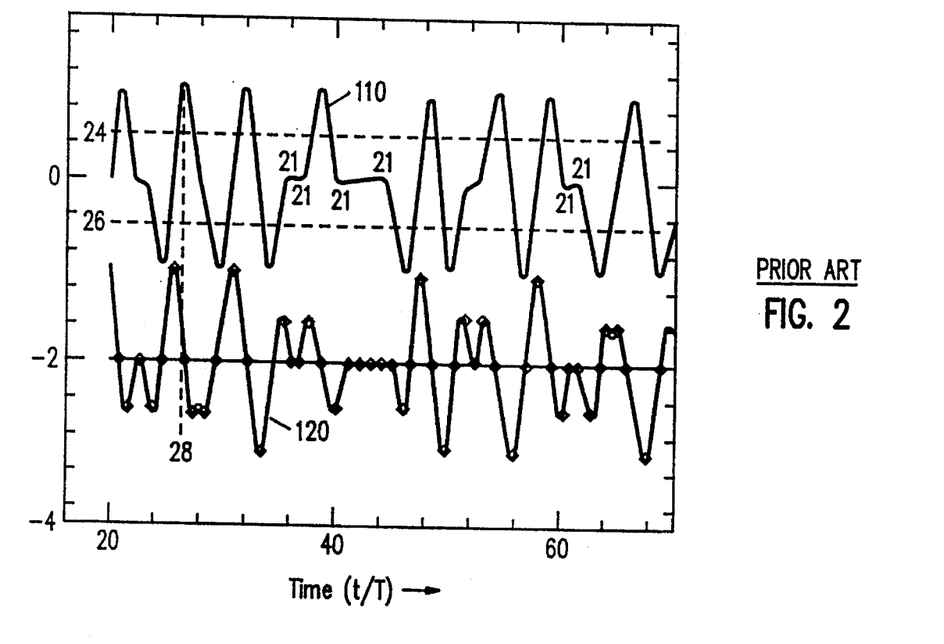
FIG. 2 illustrates prior art AQPD signals for (1,7) code.

Referring now to FIG. 2, the signal in an AQPD channel may have false peaks due to the shape and/or the presence of noise in the "shoulder" regions 21 of equalized signal 110. To minimize the possibility of a detection error arising from noise, the equalized (undifferentiated) signal amplitude must be greater than a threshold, which is typically set around half the average peak (envelope) amplitude. Often the threshold is set a little lower in the presence of modulation noise. An AQPD involves the coincident operation of two channels known as the amplitude and timing channels. Feature 28 of differentiated peak detector signal 120 illustrates a qualified zero crossing. A relevant patent for this type of detector is U.S. Pat. No. 4,081,756, "Dual Channel Signal Detector Circuit", by R. Price et al., issued Mar. 28, 1978, which describes a peak detection channel that senses the peaks of the read signal and a simultaneously operating gate generating channel that produces gating pulses in response only to individual read pulses in the read signal.

Figure 3:
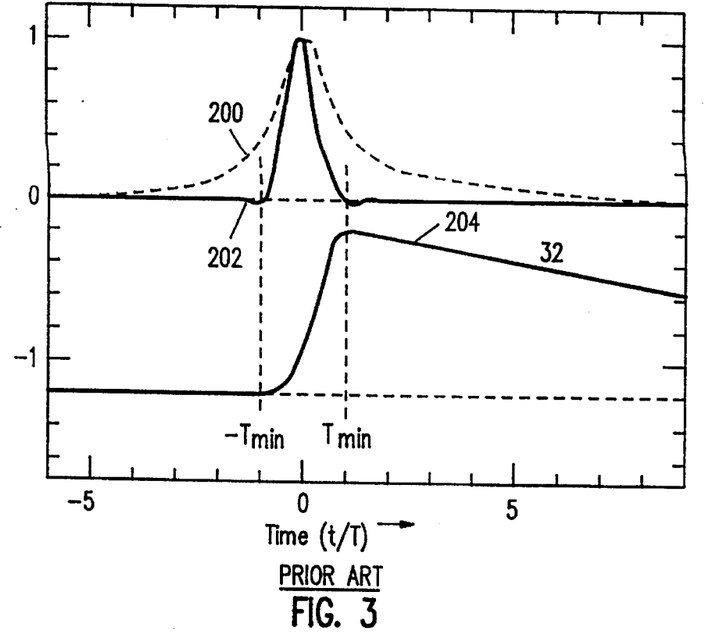
FIG. 3 illustrates prior art integrating detector step responses for (0, K) code.

Referring to FIG. 3, in the integrating detector, the isolated pulse 200 is also equalized if needed to be bounded in time (pulse 202), and then integrated (pulse 204) to provide the desired zero-crossing event. The integration must be imperfect (represented by a pole on the negative real axis near the origin) to avoid excessive low frequency noise enhancement. The imperfect integration results in a droop in the isolated pulse response, which is illustrated at feature 32 of integrated pulse 204. Integrating detectors must be used with encoded data having codes that have d.c.-free write current or with decision feedback equalization (DFE) in order to avoid excessive baseline shift due to intersymbol interference (ISI) from distant neighbors.

Figure 4:
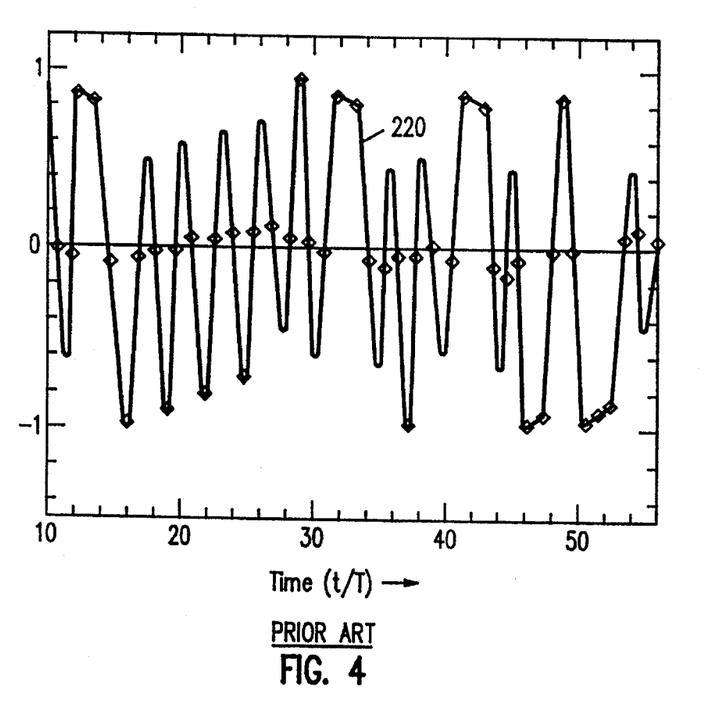
FIG. 4 illustrates prior art integrating detector signals for (0, 3) CCRLL code.

Referring to FIG. 4, baseline shift in signal 220 appears as a slow variation in the location of signal samples at the clock time, i.e., the diamonds near the baseline. Since the signals in integrating detectors do not approach zero between peaks, amplitude qualification is not needed, and, therefore, integrating detectors require only one channel, the timing channel, for the decision process.

Run Length Limited (RLL) codes for encoding data are defined from the viewpoint of NRZI, where for each bit cell, a "1" represents a recorded magnetic transition, and "0" represents no transition. In standard m/n(d,k) RLL codes, m data bits are mapped into n code bits, for a code rate of r=m/n. There is a minimum of d and a maximum of k NRZI code "0"s between adjacent "1"s. The clock period of the code is $T_C=(m/n)T_d$, where $T_d$ is the data period. The run length constraints can be described alternately as a minimum of d+1 and a maximum of k+1 clock intervals between recorded transitions. The minimum time between transitions is $T_{min}=(d+1)T_C$. The detection window, $T_W$, is equal to $T_C$. The purpose of RLL codes is to make the code self-clocking by limiting the maximum run of "0"s, and sometimes (but not always) to increase $T_{min}$ to a value greater than $T_d$. A readback pulse peak detected anywhere within a window is assumed to have been written at the center of that window.

The charge of the write current is integral of the normalized write current ($i_W=\pm1$) starting at some arbitrary time, where time is normalized to $T_C$. The sign of the write current alternates at each transition. For normal recording techniques (i.e., no write equalization), a transition spacing of s contributes to $\pm s$ to the accumulated charge. The example below shows the accumulated charge of a (1,7) RLL data pattern:

| SPACING s | 4 | 2 | 3 | 2 | 2 | 5 | 8 | 2 | 2 | 4 |
|---|---|---|---|---|---|---|---|---|---|---|
| polarity | + | − | + | − | + | − | + | − | + | − |
| CHARGE | 4 | 2 | 5 | 3 | 5 | 0 | 8 | 6 | 8 | 4 |

In d.c.-free RLL modulation codes, the maximum accumulated charge, |c|, is constrained. Such codes are also called charge-constrained RLL (or CCRLL) codes. CCRLL codes and their maximum theoretical code rate (or channel capacity) as a function of d, k, and c are described by K. Norris and D. S. Bloomberg, "Charge-Constrained Run-Length Limited Codes", IEEE Trans. Magn., vol. MAG-17, no. 6, Nov. 1981, p. 3452. Constraining the charge reduces the channel capacity. Actual codes are designed to operate at code rates as close as possible to this maximum without excessive hardware complexity. For example, the standard (1,7) RLL code with no c-constraint has a maximum possible code rate r of 0.6793 and operates at r=⅔=0.6667. (1,7) CCRLL code rates would have to be ⅝ or ⅗ (0.625 or 0.6), depending on c. The minimum attainable value of c is $c_{min}$=int(k/2+1). CCRLL codes are used in magnetic recording systems with rotary transformers, which cannot pass d.c. in the write current. A good example is the 8/10 (0,3) R-DAT code, with c=3. CCRLL codes can be difficult to design, especially at code rates close to the capacity. Procedures for their design are familiar to coding specialists in this field.

Equalizers for peak detectors are designed to minimize ISI so that each peak may be discretely detected. Such equalizers are sometimes called "zero forcing" equalizers.

At worst, a small amount of ISI is tolerated due to the tradeoff between slimming and high frequency noise enhancement. Partial Response (PR) equalizers employ deliberate ISI to reduce the high frequency noise enhancement. This makes the channel more closely resemble the matched filter, improving the equalized pulse signal-to-noise ratio (SNR). PR equalization is used with maximum likelihood (ML) detectors, whose function is to separate optimally the data out of the deliberately overlapping or interfering pulses. ML detectors sample the signal at discrete times which are not necessarily tied to specific events such as peaks.

Because PR equalization is so closely associated with ML detection, the acronym "PRML" is well-known in the literature. The Vertibi detector is the best known ML detector for use with PR equalization. The terms "Viterbi" and "ML" are sometimes used interchangeably. PRML was first proposed for magnetic recording systems by Kobayashi and Tang of IBM in 1970 and 1971. See H. Kobayashi and D. Tang, "Application of Partial-Response Channel Coding to Magnetic Recording Systems", IBM Jrnl. of Res. & Dev., vol. 14, no. 4, July, 1970, p. 368; and H. Kobayashi, "Application of Probalistic Decoding to Digital magnetic Recording Systems", IBM Jrnl. of Res. & Dev., vol. 15, no 1, January, 1971, p. 64. See also P. Kabal and S. Pasupathy, "Partial Response Signaling", IEEE Trans. Commun., vol. COM-23, no. 9, p. 921, September 1975. PRML channels are described in R. Wood and D. Petersen, "Viterbi Detection of Class IV Partial Response on a Magnetic Recording Channel", IEEE Trans. Commun., vol. COM-34, no. 5, May 1986, p. 493; and F. Dolivo, "Signal Processing for High-Density Digital Magnetic Recording", Proceedings of COMPEURO 90, Hamburg, W. Germany, May 8–12, 1989.

Peak detection recording systems are generally characterized by their isolated pulse or step response (response to the NRZI . . . 0001000 . . . pattern, where "1" is a transition and "0" is no transition). This is their response to a single recorded transition. PRML systems, by contrast, are characterized by their equalized pulse response (response to the NRZ . . . 0001000 . . . pattern, equivalent to NRZI . . . 00011000 . . . ), where the write pulse consists of two write current steps (or recorded transitions) separated by the clock period, T. NRZI recording is in fact a type of precoding, which is discussed elsewhere in this specification, performed on NRZ data to minimize error propagation in peak detection channels. The use of the pulse response facilitates the description of the system state for the ML detector and eliminates the need to keep track of the alternating signs of the NRZI transitions.

Standard PR systems are described by pulse response polynomials of the form $F(D)=(1-D)^m(1+D)^n$, where D is the delay operator equivalent to the clock period T. The pulse response polynomial is equivalent to the expected pulse response at sampling times, i.e. bit cells. For example, the partial response type 4 (PR4) polynomial is $(1-D)(1+D)=1-D^2$. The expected pulse response at the sampling times is . . . 000101000 . . . The step response (isolated pulse) can be derived by dividing the response polynomial by $(1-D)$. For PR4, it is $1+D=$ . . . 00011000 . . . at sampling times. The PR4 isolated pulse peak is located between the two nonzero sampling points, i.e., the PR4 signal is sampled on non-events off the peaks. Because of this sampling parameter, timing recovery for PR systems must be performed by sophisticated digital techniques, as described in Dolivo (supra), or by a separate analog timing channel.

The equivalent PR polynomial for standard peak detection is $F(D)=1-D$, which corresponds to a step response of 1 (i.e., . . . 000100000 . . . at sampling times). The minimum bandwidth pulse corresponding to this step is $f_{min}(t)=\sin(\pi t/T)/(\pi t/T)$, which is unattainable in practice because its frequency spectrum G(f) is constant up to a cutoff frequency of $|f_c|=\frac{1}{2}T$, and beyond this frequency. Practical peak detection systems with analog equalization operate with considerable excess bandwidth and trade off pulse slimming with noise enhancement. The $(1-D)$ term arises from the differentiation in the read process for inductive heads or the sensitivity to the perpendicular field in magnetoresistive heads. Because it is considered to be intrinsic to magnetic recording, the PR channels previously discussed in magnetic recording literature contain the $(1-D)$ pulse response term. One exception is described in R. Wood, "New Detector for 1,k Codes Equalized to Class II Partial Response", IEEE Trans. Magn., vol. MAG-25, no. 5, September 1989, p. 4075, which describes a PR2 channel for a (1,k) code that uses a type of decision feedback called a "Modified Linear Canceler" that does not resemble the present invention.

The standard PR precoding algorithm is the 1/F' (D) operation on the NRZ encoded bit pattern, where F' (D) is the expanded response polynomial F(D) with + and– replaced by the (+mod 2) or XOR operator. This replacement results in even output levels for code "0"s and odd output levels for code "1"s, eliminating error propagation. For $F(D)=1-D$ or $1+D$ (PR1), precoding simply converts NRZ data to NRZI. Terms in the F(D) expansion with even coefficients (such as the D term in PR2) drop out of F' (D). Curiously, this makes PR2 precoding identical to PR4. The precoder is a conventional element of PRML systems, and is discussed in detail in the classic papers on PRML.

By noting that the Fourier transform of the delay operator $D=\delta(t-T)$ is $\exp(-j2\pi fT)$, it can be shown that the $(1+D)^n$ in the PR polynomial is equivalent to a frequency response term of $\cos^n(\pi fT)$ in the equalized pulse response, and the $(1-D)^m$ factor is equivalent to a frequency response term of $j\sin^m(\pi fT)$. PR systems with higher values of m therefore have more gradual and easily realizable high frequency rolloffs and are better matched to the properties of magnetic recording channels. Partial response systems with the $(1+D)^n$ factor have a response null at the maximum write frequency for (0,k) codes, $f_{max}=\frac{1}{2}T$, i.e., the NRZ . . . 010101000 . . . pattern (a transition for every clock interval; equivalent to the NRZI . . . 1111 . . . pattern). As a result of this null, modulation codes for PR systems must be designed to eliminate long runs of this pattern, in a manner similar to the elimination of long runs of the NRZ . . . 0000 . . . and NRZ . . . 1111 . . . patterns (both equivalent to long runs of NRZI "0"s).

Table I gives some of the details of the most important PR channels. The PR names are arbitrary labels of no particular significance which were originated in E. Kretzmer's "Generalization of a Technique for Binary Data Communication", IEEE Trans. Commun. Techn., vol. COM-14, February 1966, p. 67.

TABLE I

PARTIAL RESPONSE SYSTEMS

| Name | Pulse Response Polynominal F(D) | No. of Levels | No. of States | % Speed Tolerance | Min. Eye Width |
|---|---|---|---|---|---|
| PR 1 | 1 + D | 3 | 2 | 42.5 | 0.667T |
| PR 2 | $(1 + D)^2 =$ $1 + 2D + D^2$ | 5 | 4 | 26.6 | 0.689T |

TABLE I-continued

PARTIAL RESPONSE SYSTEMS

| Name | Pulse Response Polynominal F(D) | No. of Levels | No. of States | % Speed Tolerance | Min. Eye Width |
|---|---|---|---|---|---|
| PR 4 | $(1 + D)$ $(1 - D) =$ $1 - D^2$ | 3 | 4 $(2 \times 2)$ | 15.5 | 0.357T |
| EPR 4 | $(1 + D)^2$ $(1 - D) =$ $1 + D -$ $D^2 - D^3$ | 5 | 8 | 14.1 | 0.363T |

The speed tolerance and eye pattern width, which are both measures of timing sensitivity, are taken from Kabal and Pasupathy (supra). The (1–D) factor in F(D) eliminates the d.c. content of partial response signals. D.C. content is present in PR1 and PR2 signals, neither of which contain the (1–D) factor. PR1 and PR2 equalization is intended for use in communication channels other than magnetic recording systems that can support d.c. signals. Thus, these other channels are neither strictly analogous to nor considered useful in the art of magnetic recording.

The prior art of magnetic recording teaches that the (1–D) factor must be present in the partial response polynomial. Some examples: "A magnetic recording channel can be treated as a partial-response channel that possesses an inherent factor (1–D) in its discrete transfer function," H. Kobayashi and D. Tang. "The 1–D factor is included in the channel transfer function of magnetic recording systems because of the inherent differentiation in the playback process," J. Moon and L. R. Carley. "Among the PR schemes, class-IV signaling (PR-IV) with polynomial $1-D^2$ and extended class-IV (EPR-IV) with polynomial $1+D-D^2-D^3$ exhibit spectral nulls at DC and at half the signaling rate. They are thus well suited for the type of bandpass channels encountered in magnetic recording," F. Dolivo. "The combined transfer function of the zero-order hold and write process blocks, as shown, is similar to that of the (1–D) partial response system. Thus, partial response polynomials for saturation recording must include a (1–D) factor," H. Thapar and A. Patel.

Figure 5:
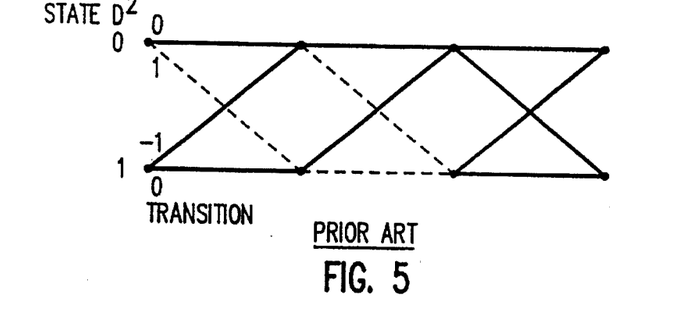
FIG. 5 illustrates a partial response Viterbi trellis for a PR4 detector.
Figure 6:
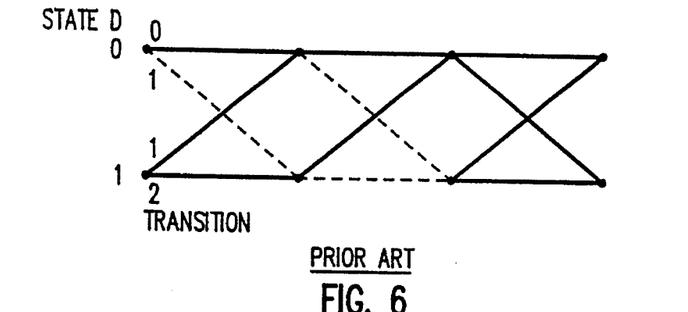
FIG. 6 illustrates a partial response Viterbi trellis for a PR1 detector according to the present invention.

The input to a Viterbi detector is sampled data, which is usually digitized. The operation of a Viterbi detector is usually visualized by means of the Viterbi trellis, illustrated in FIGS. 5, 6 and 7 for PR2, PR2, and PR4 equalization, respectively. The state of the system is the contents of a memory contained within the Viterbi detector whose size is determined by the number of samples, L, over which the response is spread. There are $2^{L-1}$ states, derived from the L-1 samples prior to the present sample, which is not a part of the state (i.e., memory). The expected sample value E(D), or "transition" (FIG. 5) is derived from the PR polynomial, F(D). For data pattern A(D), E(D)=A(D) F(D). For example, for PR2 equalization $(F(D)=(1+D)^2=1+2D+D^2)$, if the previous two bits ($D^2$ and D) are 1 and 0, and the present bit is 1, the transition value is 2.

Starting with a known state (a node on the Viterbi trellis), the Viterbi detector compares each data sample with the expected transition on the trellis for each path starting at that state, calculating and storing the square metric (the sum of the squares of the difference between the samples and the expected transitions) for each path on the trellis. Whenever more than one path enters a node, the one with the worst metric is eliminated. Where there is only one surviving path leaving the starting node, a decision has been made. In actual Viterbi detectors, this algorithm is simplified to reduce the detection process to a sequence of add, compare, and select operations in order to minimize hardware complexity. These simplifications do not alter the substance of the algorithm. The design of a Viterbi detector for any of the above referenced PR equalizations can be accomplished by an engineer versed in the art of digital circuit design. See, for example, R. Wood and D. Petersen, "Viterbi Detection of Class IV Partial Response on a Magnetic Recording Channel", IEEE Trans. Commun., vol. COM-34, no. 5, May 1986, p. 493.

For white noise, the performance improvement over symbol-by-symbol detection is largely determined by the minimum distance error event, which is the difference between any pair of paths starting and ending at the same node that has the minimum squared distance metric $d_{min}^2$ (the sum of squares of the differences between expected transitions). These paths are illustrated by the pairs of dashed paths in FIGS. 5, 6 and 7. For PR1 and PR4, $d_{min}^2=2$. For PR2 and EPR4 (not illustrated), $d_{min}^2=4$. The effective SNR improvement of the Viterbi detector is $10 \log_{10}(d_{min}^2)$, or and 3 dB for PR1 and PR4 and 6 dB for PR2 and EPR4. This equation assumes white (uncorrelated) noise at the Viterbi detector input.

Figure 7:
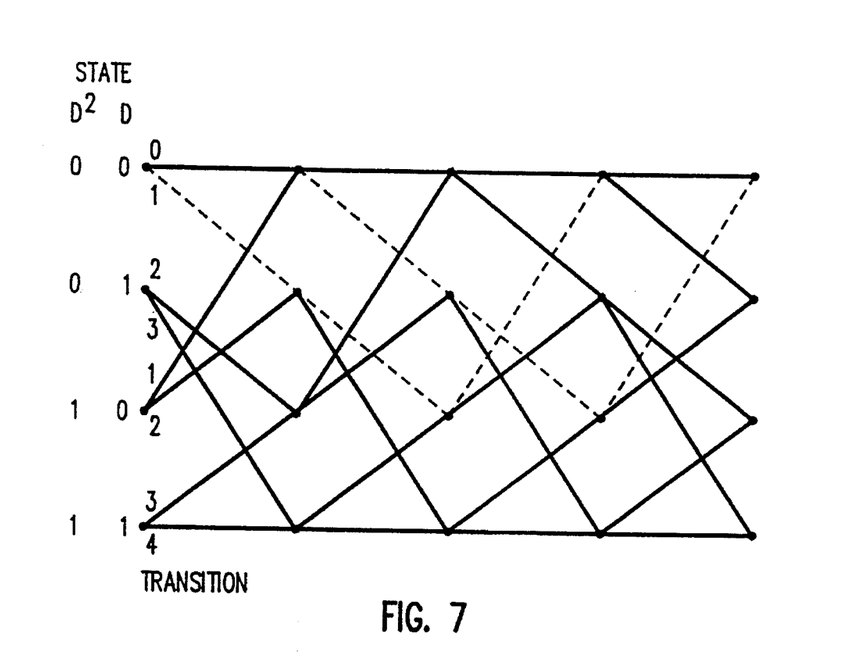
FIG. 7 illustrates a partial response Viterbi trellis for a PR2 detector according to the present invention.

For the simple partial response systems under consideration, the minimum distance error event results from one of two situations: a missing (or added) bit, e.g., 00000 vs. 00100; or a shifted bit, e.g., 001000 vs. 000100. The two dashed paths illustrated for PR2 in FIG. 7 represent data 0001000 and 0010000, i.e., a shifted bit error with a squared distance metric of 4. For PR2, the squared distance metric for the missing bit error is 6. The noise at the Viterbi detector input is not generally white (uncorrelated). For PR4, both the missing and shifted bit errors are immune to correlated noise. For PR2, the shifted bit error is immune to correlated noise, but the missing bit error, which has a larger difference metric to begin with, may be highly sensitive.

It is known in the art of communication technology (which includes magnetic recording) that the best signal-to-noise ratio for a received pulse is obtained by passing the pulse through a matched filter, which is a circuit whose transfer function is proportional to the Fourier transform of the pulse. A matched filter widens the pulse. Partial response recording channels were developed to enable equalizers for high density recording systems (i.e., systems that suffer from intersymbol interference) to resemble matched filters more closely than is possible for peak detector equalizers, which must generally slim the pulse. While $(1-D)(1+D)^n$ equalizers such as PR4 and EPR4 are generally a better match to the pulse spectrum than peak detector equalizers, they may not be a good match at low frequencies, particularly for UMR heads, which have a high level of low frequency energy that is in effect thrown out by such equalizers. A need has been felt to achieve higher recorded densities by means of partial response channels that are a better match to the UMR pulse response.

SUMMARY OF THE INVENTION

The present invention comprises a readback channel for digital magnetic recording systems which combines a d.c.-free equalizer to approximate the $(1+D)^n$ pulse response with a d.c.-free modulation code and comprises the elements described below.

a) An encoder for encoding data with a charge-controlled (d.c.-free) modulation code characterized by (d,k) run length constraints, as well as an additional constraint limiting the run length of the NRZI 111111 ... ($f=\frac{1}{2}T$) code pattern. The preferred embodiment of the modulation code has (0,k) run length constraints.

b) A readback equalizer with a d.c.-free pulse response that approximates the normal $(1+D)^n$ partial response polynomial ($1+D$ for PR1 or $(1+D)^2$ for PR2). Two classes of pulse response meeting this criterion are identified:

i) A causal pulse response that resembles the integrating peak detector channel, and is suitable for magnetic recording systems where the plurality of the unequalized pulse response energy in the vicinity of the $\{-T_{min}, T_{min}\}$ region. This includes systems employing inductive and shielded magnetoresistive (SMR) heads.

ii) A symmetrical pulse response that is suitable for magnetic recording systems where the plurality of the unequalized pulse response energy is spread well beyond the $\{-T_{min}, T_{min}\}$ region. This includes systems employing UMR and dual MR (DMR) heads. The preferred embodiment of the system of the invention employs a novel implementation of PR2 equalization.

c) A maximum likelihood (ML) detector for said $(1+D)^n$ pulse response polynomial, characterized by $2^n$ states (two states for PR1; four states for PR2). A Viterbi detector is the preferred embodiment of the ML detector for the system of the present invention.

d) A decoder for decoding data encoded with the charge-controlled modulation code described in paragraph a) above.

The prior art teaches that the intrinsic properties of the magnetic recording systems require the inclusion of the $(1-D)$ factor in the partial response polynomials. This factor is omitted in the present invention. The prior art also teaches that an equalizer should be designed for a pulse response that approximates the partial response polynomial as closely as possible, whereas the present invention calls for a deliberate deviation from that polynomial. The present invention, with a modified R-DAT 8/10 (0,3) CCRLL code and with an approximate d.c.-free PR2 equalizer, can provide very significant linear recording density increase over any known peak detection channel, as well as any of the PRML channels known in the prior art of magnetic recording, including PR4 and EPR4 channels.

The advantages of a PR2 channel according to the preferred embodiment of present invention are summarized below.

1) $(1+D)^n$ PR channels, equalized according to the teachings of the present invention, can attain higher linear recording densities for a specified error rate than comparable $(1-D)(1+D)^n$ PR channels, where PR1 is compared to PR4 and PR2 is compared to EPR4. In particular, the PR2 channel can attain significantly higher linear recording densities, on the order of 30% higher, for a specified error rate than any of the prior art PRML channels used in or proposed for magnetic recording (PR4 and EPR4) as well as any prior art peak detector channels. This benefit arises because, at very high recording densities, the nonideal PR2 signal is a better match to the magnetic recording channel than the previous art PRML signals (PR4 and EPR4), and hence has a better SNR at the detector input.

2) The $(1+D)^n$ PR channels have a significantly greater speed tolerance and window pattern opening width than the comparable $(1-D)(1+D)^n$ PR channels.

3) The $(1+D)^n$ PR channels have fewer, i.e. about half as many, Viterbi detector states as the comparable $(1-D)(1+D)^n$ PR channels, thereby reducing the hardware complexity.

4) The PR2 channel does not have certain ambiguities present in the EPR4 channel, whose Viterbi trellis is not illustrated. For example, for EPR4, the repeated 1000 data pattern results in exactly the same transitions as the repeated 1101 pattern: 1 1 -1 -1. Of the sixteen possible repeated four bit data patterns, twelve have similar ambiguities requiring run length limitations. A modulation code for EPR4 code must therefore eliminate long run lengths of these patterns. This complicates code design and reduces the channel capacity. Thus, apparently no (0,k) modulation code for EPR4 has appeared in the literature to date. The only limits on the PR2 code are that 1) it must be charge-constrained, and 2) run lengths of 0000 ... 1111 ... and 010101 ... must be limited.

5) Since a d.c.-free modulation code is required with the present invention, it can be applied to magnetic recording systems that already require a d.c.-free modulation code without loss of channel capacity. This includes systems with rotary magnetic heads, such as R-DAT, 8 mm., VHS, and High Definition TV systems presently under development. It also includes systems with UMR or DMR heads. All of these systems are of enormous economic importance.

BRIEF DESCRIPTION OF DRAWING

For fuller understanding of the present invention, reference is made to the accompanying drawings in the following detailed Description of the Preferred Embodiment of the invention. In the drawings.

Reference numbers refer to the same or equivalent parts of the present invention throughout the several figures of the drawing.

DESCRIPTION OF THE PREFERRED EMBODIMENTS

Figure 8:
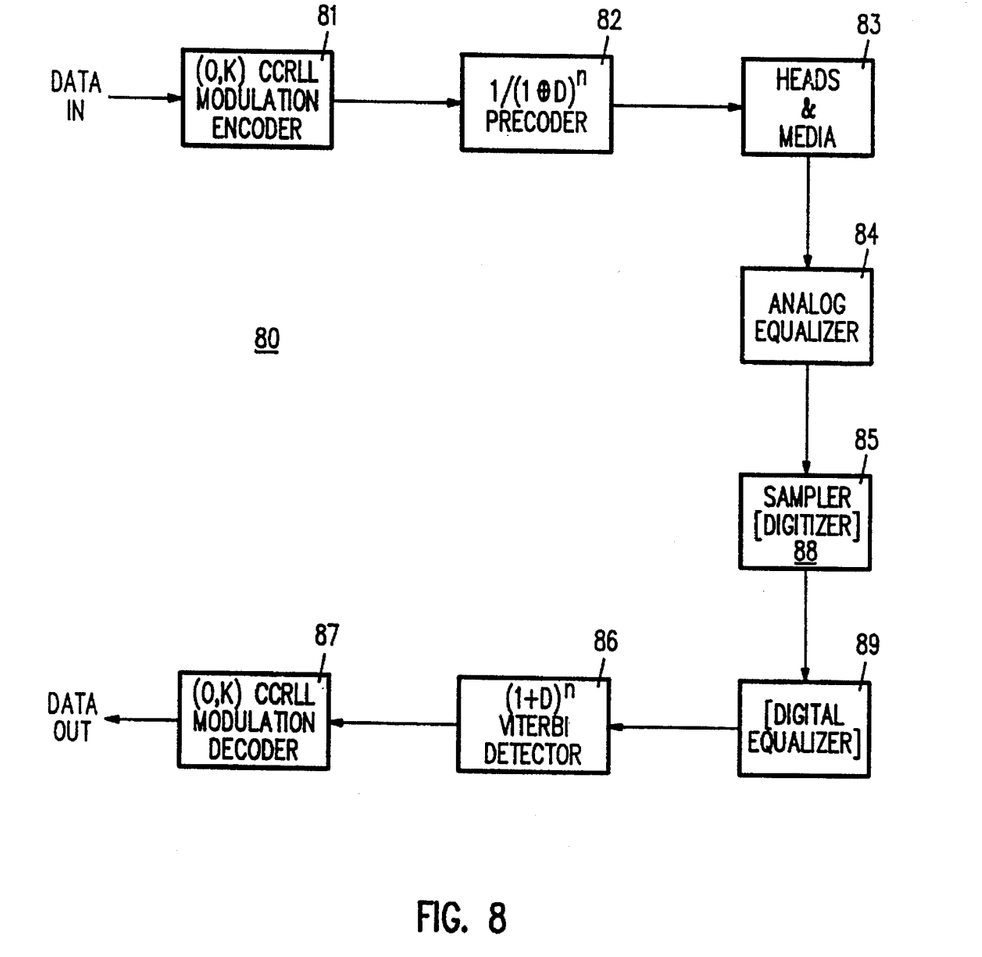
FIG. 8 is a block diagram of digital magnetic recording system constructed according to the principles of the present invention.

Referring to FIG. 8, magnetic recording channel 80, constructed according to the principles of the present invention, comprise modulation encoder 81, precoder 82, recording heads and media 83, analog equalizer 84, sampler 85, detector 86 and modulation decoder 87. Optionally, channel 80 may include digitizer 88 in phace of sampler 85 and digital equalizer 89. The D.C.-free approximate $(1+D)^n$ equalizer of the present invention is partitioned between analog and digital elements as described elsewhere in this specification. The design of the equalizer and detector elements of channel 80 are the subject of the present invention.

Equalizer Design

For equalizer design, the ideal performance targets can be specified mathematically. The minimum bandwidth step response $F_{PRn}$ for ideal $(1+D)^n$ PR equalization is given the following frequency domain equation:

$$F_{PRn}(\omega) = \cos^n\left(\frac{\pi f}{2f_c}\right); 0 < |f| < f_c \quad (1)$$

$$= 0; |f| \geq f_c$$

$$f_c = 1/2T$$

$n = 1$ for PR1; $n = 2$ for PR2.

The step response, $F_{PRn}(\omega)$, is nonzero and finite at d.c. (f=0). The time domain pulse response $f_{PRn}(t)$ is the inverse Fourier transform of $F_{PRn}(\omega)$. Its normalized values are exactly $(1+D)^n$ at times $t=\pm kT$ (k an integer) when the signal is sampled by the detector.

The equivalent ideal minimum bandwidth isolated pulse or step response is derived by noting that the pulse response is the step response multiplied by the $(1-D)$ operator, whose frequency domain equivalent is $j \sin(\pi fT)$ (where $T=\frac{1}{2}f_c$).

$$G_{PRn}(\omega) = \frac{\cos^n\left(\frac{\pi f}{2f_c}\right)}{j \sin\left(\frac{\pi f}{2f_c}\right)}; 0 < |f| < f_c \quad (2)$$

$$= 0; |f| \geq f_c$$

Figure 9:
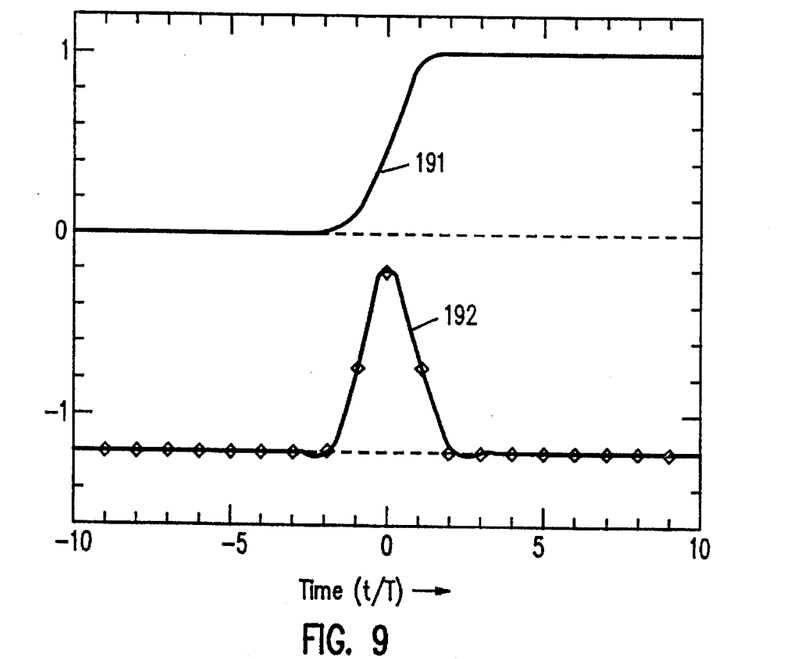
FIG. 9 illustrates ideal PR2 detector pulse and step responses.

This step response, $G_{PRN}(\omega)$, is infinite at d.c. The ideal time domain PR2 (n=2) step and pulse responses, 191 and 192, respectively, i.e., $f_{PR2}(\omega)$ and $g_{PR2}(\omega)$, are illustrated in FIG. 9.

The unequalized isolated pulse or step response $G_{uneq}(\omega)$ (i.e., the step response measured at the playback head) is finite at d.c. The pulse response for such is zero. This includes systems employing inductive heads (thin film, ferrite, composite, metal-in-gap (MIG), etc.) as well as either shielded and unshielded MR heads. For example, the step response of systems with inductive ferrite heads is approximated by the Lorentzian function, $g_{uneq}(t)=1/(1+(2t/T_{50})^2)$, or equivalently, $G_{uneq}(\omega)=\exp(-\pi T_{50}|f|)$, which is finite at d.c. Thus, the equalizer transfer function $H(\omega)= G_{PRn}(\omega)/G_{uneq}(\omega)$ required to achieve the ideal step response, $G_{PRn}(\omega)$ of Equation (2) indicates that such an unmodified equalizer would have infinite gain at d.c. This would result in disastrous enhancement of low frequency noise leading to an unacceptable rate of detection errors. The low frequency noise enhancement would result also in a gradual wander of the average signal level (the baseline), which could exceed the dynamic range of the analog-to-digital converter and/or the amplifier in the maximum likelihood detector.

To obviate the problems arising from infinite d.c. equalizer gain, the present invention utilizes an equalizer having a response modified to have a pulse response of zero at d.c. and a step response that is finite at d.c. The time domain pulse response for the new equalizer targets will no longer be exactly $(1+D)^n$ at times $t=\pm kT$(k an integer) when the signal is sampled by the detector, but will be a close approximation.

Two equalizer response targets will be presented. The first is suited for systems where the plurality of the unequalized pulse response energy (which is proportional to the square of the signal voltage) is located in the vicinity of the $\{-T_{min}, T_{min}\}$ region, where $T_{min}$ is the minimum distance between written transitions. Systems employing inductive heads and shielded MR heads are typical of this category. Since this equalizer closely resembles the integrating equalizer for peak detection (FIG. 3), its response will be denoted by the subscript INT. The integrating equalizer pulse response $F_{INT}$ and step response $G_{INT}$ are given by the following equations:

$$G_{INT}(\omega) = \frac{\cos^n\left(\frac{\pi f}{2f_c}\right)}{j \sin\left(\frac{\pi f}{2f_c}\right) + \frac{\pi f_L}{2f_c}}; 0 < |f| < f_c \quad (3)$$

$$= 0; |f| \geq f_c$$

$$F_{INT}(\omega) = j \sin\left(\frac{\pi f}{2f_c}\right) G_{INT}(\omega)$$

$$f_L << f_c$$

$n = 1$ for PR1; $n = 2$ for PR2.

Figure 10:
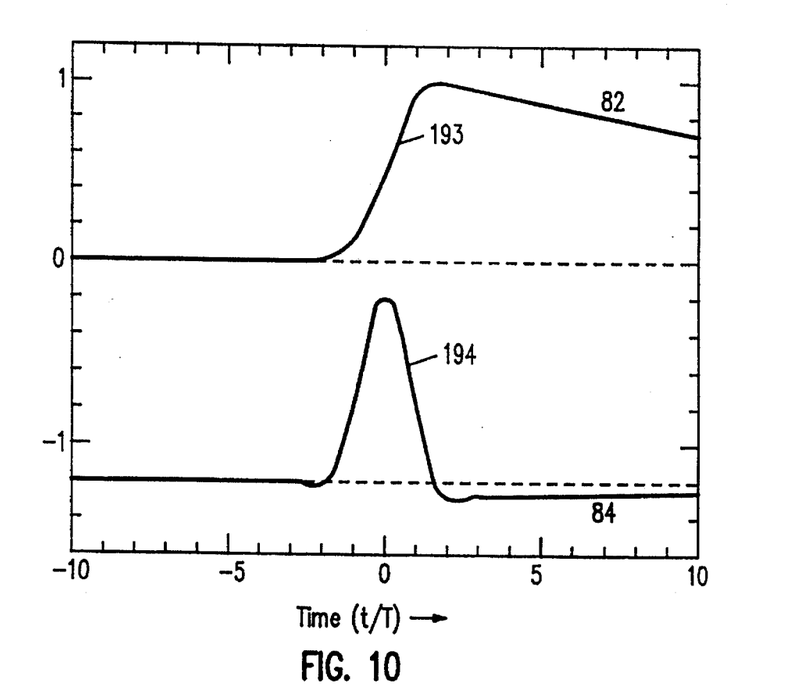
FIG. 10 illustrates integrating PR2 detector pulse and step responses.

The pulse response is zero at d.c. while the step response is finite at d.c. The integrating equalizer time domain step and pulse responses 193 and 194, respectively, are illustrated for the case of PR2 (n=2) in FIG. 10. Both the pulse and step responses for this case are causal, in that they have very little energy prior to $-T_{min}$.

The second equalizer target is suited for systems where a plurality of the unequalized pulse response energy is spread far beyond the $\{-T_{min}, T_{min}\}$ region. Systems employing UMR and DMR heads fall into this category. These systems are also characterized by relatively high levels of long wavelength response. Because this equalizer resembles the integrating equalizer in certain respects, but differs from it in others, it has been named the quasi-integrating (QI) equalizer. A QI equalizer for peak detection was described in a copending patent application, Ser. No. 07/891,010, assigned to the assignee hereof which is incorporated by reference as if fully set forth herein.

The QI equalizer pulse response $F_{QI}$ and step response $G_{QI}$ are given by the following equations:

$$G_{QI}(\omega) = \frac{\cos^n\left(\frac{\pi f}{2f_c}\right)}{j\left[\sin\left(\frac{\pi f}{2f_c}\right) + \frac{\pi f_L^2}{2f_c f}\right]}; 0 < |f| < f_c \quad (4)$$

$$= 0; |f| \geq f_c$$

$$F_{QI}(\omega) = j \sin\left(\frac{\pi f}{2f_c}\right) G_{QI}(\omega)$$

Both the pulse and step responses are zero at d.c. The QI equalizer time domain step and pulse responses 195 and 196, respectively, are illustrated for the case of PR2 (n=2) in FIG. 11. The pulse response is symmetrical while the step response is antisymmetrical. The QI equalizer is similar to the integrating equalizer except that its step response has a d.c. null and its pulse response is symmetrical rather than causal. For the UMR head, the d.c. null is provided by a differentiator element which helps to attenuate undesirable low frequency noise.

These equations are not unique representations of the equalizer, whose essential property is a d.c.-free approximation to the $(1+D)^n$ pulse response polynomial. Other equalizers that have a d.c.-free pulse response would fall within the scope of the present invention. These particular equations have been chosen because they have several useful properties. (1) They approach the ideal equations for $(1+D)^n$ PR equalization as $f_L$ approaches zero. (2) Decay time of the skirts of step responses 193 and 195, respectively, feature 82 of FIG. 10 and features 92 and 94 of FIG. 11, respectively, are inversely proportional of $f_L$. (3) The equations for the integrating and QI targets are very similar, differing in just two significant respects: (a) the d.c. step response is zero for the QI target, while it is nonzero and finite for the integrating target, and (b) the step response is anti-symmetrical for the QI target, while it is causal for the integrating target. (4) The integrating equalizer target can be obtained by passing the ideal $(1+D)^n$ equalizer target signal through a simple RC high pass filter with time constant $\tau = RC = 1/2\pi f_L$.

Equalizer Implementation

Referring again to FIG. 8, an equalizer is a linear network that shapes an unequalized input pulse into a desired output pulse. The equalizer of the present invention may be partitioned between analog and digital elements. The minimum requirement of the analog equalizer is that it functions as a low pass filter, which removes most of the noise above the Nyquist frequency (½T). For PR2, the entire equalizer can be accomplished with analog circuitry, but for PR1, the very steep cosine high frequency rolloff cannot be attained with the limited number of elements practically attainable with analog circuitry. Since the Viterbi detector samples and normally digitizes the data, a digital equalizer is an obvious choice that can be implemented at little additional cost. Procedures for the design of digital equalizers are well known in the art of Digital Signal Processing (DSP), and are covered by such texts as "Digital Filters and Signal Processing" by Leland B. Jackson, published in 1989 by Kluwer Academic Publishers, Norwell, Mass. Digital equalizers have the advantage that they can be made adaptive, i.e., responsive to changes in the system due to media interchange, wear, aging and the like. Procedures for the design of adaptive equalizers are also well known in the art of DSP, and are covered by such texts as "Adaptive Filter Theory" by Simon Haykin, published in 1986 by Prentice-Hall, Englewood Cliffs, N.J.

For the design of an analog-only equalizer for PR2 equalization, the equalizer transfer function is expressed mathematically as the quotient of two polynomials in the complex (s) plane, where the roots of the numerator polynomial are known as "zeros", and the roots of the denominator polynomial are known as "poles". Equalizers represented by poles and zeros can be realized as RLC networks by using the techniques of circuit synthesis theory, well known to the art, and covered by such texts as "Circuit Synthesis and Design" by Gabor C. Temes and Jack W. LaPatra, published in 1977 by McGraw-Hill. Equalizer chips are now available that allow the pole and zero values to be programmed. An example of such a chip is the IMP 4250 Programmable Continuous-time Filter, in which up to six poles and six zeros can be programmed, available from International Microelectronic Products, of San Jose, Calif.

The prior art of analog equalizer design typically used the step response (isolated readback pulse) as its basis. Since the step response of an unshielded magnetic resistive head cannot be measured directly because of head saturation, the present equalizer design procedure is based on the pulse response, which does not saturate the UMR head. This procedure is also applicable to inductive heads. The length of the pulse is $T_1$, which is normally the same as T or $T_{min}$ in the intended system. Any value of $T_1$ will do so long as it is short enough to avoid head saturation and long enough to provide adequate readback signal.

Figure 11:
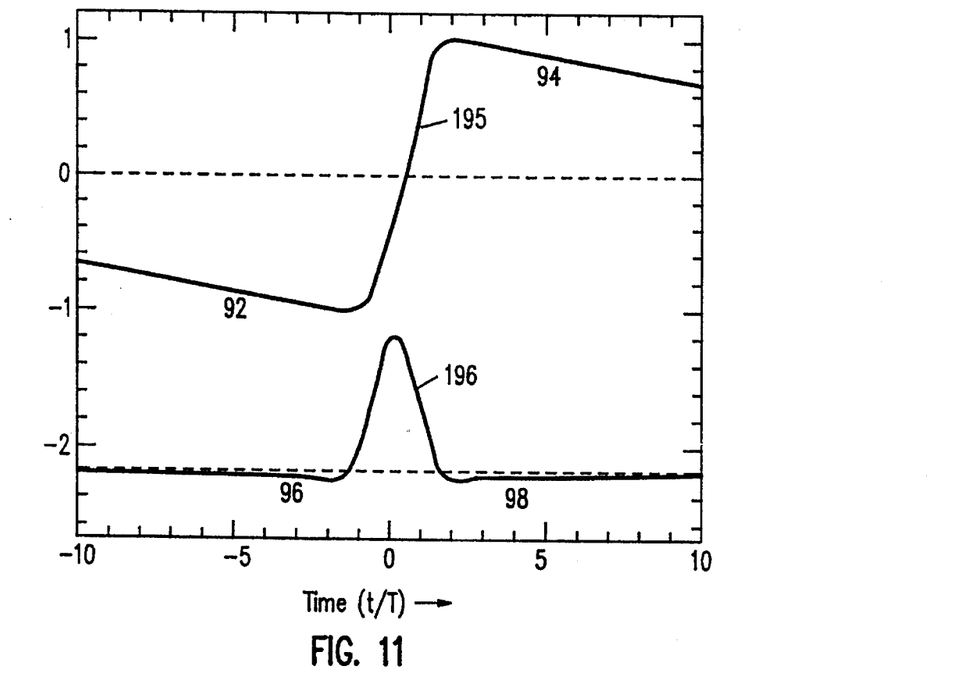
FIG. 11 illustrates QI detector PR2 pulse and step responses.
Figure 12:
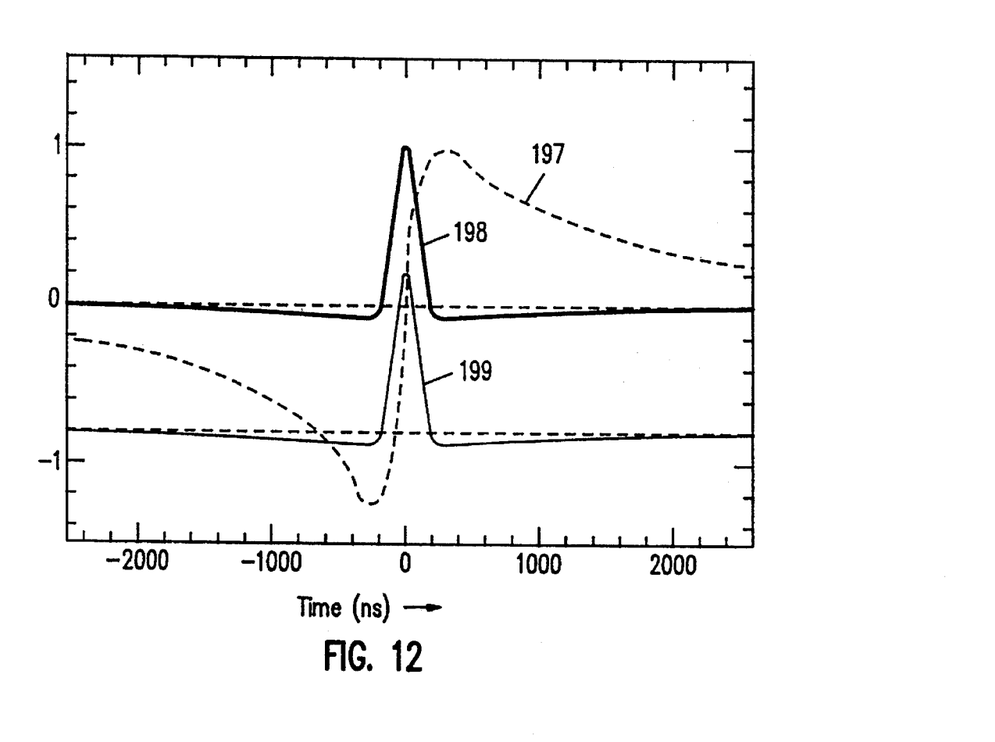
FIG. 12 illustrates pulse responses for a UMR head equalizer design.

In computer simulations, the pulse response is derived by superposing two step responses of opposite polarity. FIG. 1, feature 100, illustrates the unequalized UMR head linearized step response. FIG. 11, feature 195, illustrates the QI equalized step response. The tails of both these pulses extend over a great many $T_{min}$ intervals. The experimental pulse response is digitally acquired (in a sampled array) by using an NRZI . . . ,$T_2$, $T_1$,$T_2$,$T_1$,$T_2$, . . . pattern, where $T_2 \gg T_1$, and $T_2$ is sufficiently large to guarantee an isolated pulse response. A simulated unequalized UMR pulse response is shown in FIG. 12, feature 197.

For the UMR head, the QI equalizer can be very closely approximated with 7 poles and 3 zeros, where one of the zeros is a differentiator, i.e., it is fixed at the origin. The remaining two zeros, which are located on the positive and negative real axes, slim the pulse. The 7 poles (3 complex pairs and 1 real) low pass filter the signal. The exact number of poles is not critical. Referring to FIG. 12, the pole and zero values are obtained from a time domain optimizing program, which moves the poles and zeros (except for the differentiator, which is fixed) around the complex plane until the best least squares match between the equalizer output pulse response 198 and the target pulse response 199 is obtained for unequalized pulse 197. Subroutines to perform this type of computer optimization are found in a product called "The Optimization Toolbox for MATLAB", which is available from The Math Works, Natick, Mass.

The rise and fall time of the tails of the QI equalized pulse 196 (features 96 and 98 in FIG. 11), which is inversely proportional to IL, normally approximates the rise and fall times respectively, of the input pulse 100 (features 16 and 18 in FIG. 1). In a very similar manner, for inductive or shielded MR heads, the integrating equalizer can be closely approximated with 8 poles and 2 zeros, where one of the poles is an imperfect integrator, located on the negative real axis close to the origin. Referring to FIG. 12, the 7 pole, 3 zero equalizer output pulse response 198 strongly resembles the target 199. The number and location of the poles and zeros calculated by the optimization program are entered into a circuit synthesis program to complete the design of the actual RLC equalizer.

The Charge-Constrained (d.c.-free) Modulation Code

Baseline shift in the QI and integrating detector signals results from intersymbol interference from neighboring pulses. Because of the large temporal spread of the pulses, this can include distant neighbors. In order to avoid excessive baseline shift, which could result in a significantly increased error rate, a charge constrained (d.c.-free) modulation code must be used in these channels. The 8/10 (0,3) charge-constrained (c=3) RLL code used in the R-DAT system comes very close to meeting the requirements of this code. Its only shortcoming is that it can have infinite runs of the NRZ . . . 010101 . . . data pattern, which is the $f_{max}=1/2T$ pattern for this system, i.e., the frequency where the response null is located. Run lengths of this pattern must be limited in order to limit the Viterbi detector memory. The R-DAT code is described by a lookup table, published in the "Recommended Design Standard, R-DAT" by the DAT Conference in April 1986. The published data patterns are for NRZI encoding ("1"s for a transition; "0" for no transition), where the $f_{max}=1/2T$ pattern is NRZI . . . 1111111 . . . For 8 bit EB data pattern, the 10 bit code is NRZI . . . 1111111111. There is no limit of the repetition of this pattern.

(0,3) RLL codes have a maximum of three consecutive NRZI "0"s. An examination of the R-DAT lookup table reveals that relatively few 10 bit code patterns actually have three consecutive "0"s. An acceptable code for the $(1+D)^n$ channel can be generated by replacing the EB code pattern (NRZI 1111111111) with an unused code pattern containing three "0"s in a row that satisfies the charge constraint. Thus, NRZI 1100010001 is such a pattern. This replacement could be accomplished because the R-DAT code rate of 8/10 is well below the theoretical maximum of 0.8704 calculated by Norris and Bloomberg [1]. More optimum codes might further limit the NRZI 111111 . . . run length.

Preferred Embodiment

The equalizer of the preferred embodiment of the present invention is for n=2; i.e., partial response type 2 (PR2) with polynomial $(1+D)^2$ Higher order $(1+D)^2$ PR systems are too complex to be practically implemented at this time and may offer little actual performance advantage. Each time n is incremented, the number of Viterbi detector states is doubled and the number of levels is increased by 2. Such a PR2 equalizer has two advantages over PR1-namely, (1) for a specified error rate, it can operate at higher densities and (2) it has the cosine$^2$ high frequency rolloff, which is gradual enough to be reasonably approximated by analog equalizers. PR1 has the much more abrupt cosine high frequency rolloff, which cannot be adequately implemented with an analog equalizer. Such rolloff is a minor disadvantage since PRML systems operate on sampled data, making it relatively easy to implement digital equalization. PR1 has only three levels instead of five, and the Viterbi detector has only two states instead of four.

Figure 13:
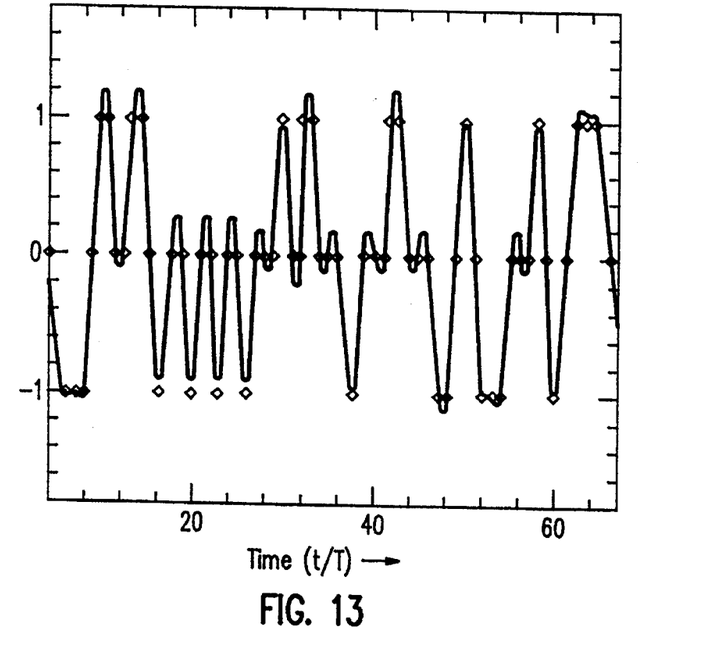
FIG. 13 illustrates a QI equalized PRI superimposed data pattern.
Figure 14:
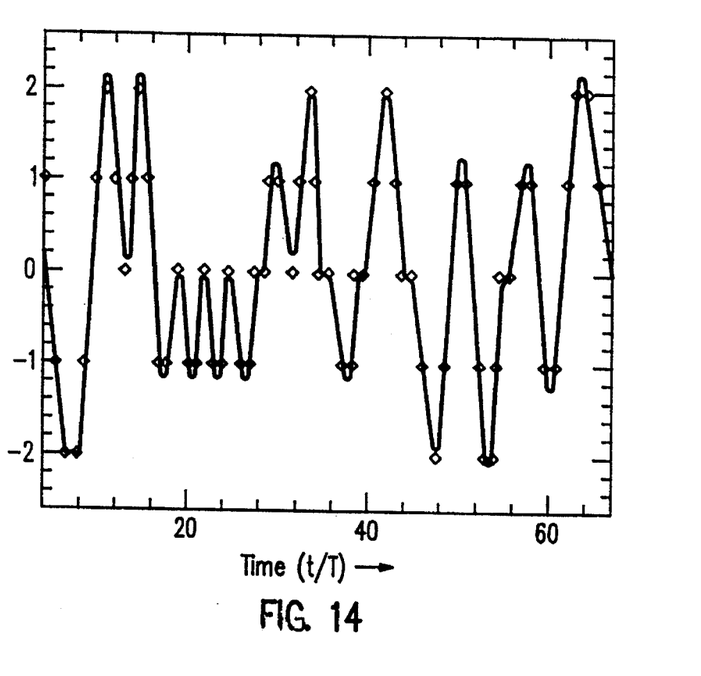
FIG. 14 illustrates a QI equalized PR2 superimposed data pattern.

FIGS. 13 and 14 illustrate the equalized response to the same R-DAT 8/10 (0,3) data pattern for QI equalized PR1 and QI equalized PR2 recording, respectively. The relative amplitude of high frequency pulses decreases in each figure: PR2 has the least high frequency content, accounting for much of its performance improvement. PR1 has three detection levels, i.e., expected samples indicated by diamonds, compared to five for PR2.

It should be noted that a ¾ (0,3) code with a charge constraint of 2 would work better than the R-DAT 8/10 (0,3) code with a charge constraint of 3. However, a ¾ (0,3) code is not yet publicly available. Generally, any charge-constrained (d, k) RLL code can be used to enable the present invention.

Summarizing for conventional systems having $(1+D)^n$ channels, the pulse response is finite and non-zero at d.c., and the step response is infinite at d.c. For the channel of the present invention, the pulse response is zero at d.c., and the step response is zero at d.c. for the symmetrical target and finite and non-zero at d.c. for the causal target.

The symmetrical target is generally appropriate for systems where the plurality of the unequalized pulse energy extends well beyond twice the minimum time between transitions, which typically includes systems with UMR and dual MR readback heads. The causal target is generally appropriate for systems where the plurality of the unequalized pulse energy is contained within approximately twice the minimum time between transitions, which typically includes systems with shielded MR and inductive readback heads. The causal target is appropriate for systems that employ decision feedback equalization (DFE) in their detector circuits.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

I claim:

1. A magnetic recording system for storing and retrieving binary data, said system comprising:

encoder means for receiving signals representing said binary data and for encoding said binary data with a d.c. free charge-controlled modulation code characterized by (d, k) run length constraints, the modulation code having an associated code rate;

equalizer means, coupled to said encoder means, having a pulse response that approximates a $(1+D)^n$ partial response polynomial and is zero at d.c. for producing equalized pulses in response to said encoded binary data;

detector means, coupled to said equalizer means, for detecting said equalized pulses; and decoder means, coupled to said detector means, for decoding said equalized pulses.

2. The system as in claim 1 wherein said modulation code is further constrained by limiting the run length of code patterns requiring a transition for every clock period.

3. The system as in claim 1 wherein said code rate is 8/10.

4. The system as in claim 3 wherein said d constraint is zero.

5. The system as in claim 3 wherein said k constraint is three.

6. The system as in claim 1 wherein said equalizer has an antisymmetrical step response target, $G_{QI}$, and a symmetrical pulse response target, $F_{QI}$, approximated by $$G_{QI}(\omega) = \frac{\cos^n\left(\frac{\pi f}{2f_c}\right)}{j\left[\sin\left(\frac{\pi f}{2f_c}\right) + \frac{\pi f_L^2}{2f_c f}\right]} ; 0 < |f| < f_c$$

$$= 0; |f| \geq f_c$$

$$F_{QI}(\omega) = j\sin\left(\frac{\pi f}{2f_c}\right) G_{QI}(\omega)$$

where $f$=frequency, $f_c$=cutoff frequency given by 1/T where T is the clock period, $f_L$=a frequency related to pulse rise and fall times.

7. The system as in claim 6 wherein $T=T_{min}$.

8. The system as in claim 6 wherein said equalizer is a PR2 equalizer and n=2.

9. The system as in claim 6 wherein said equalizer means has a pulse response of zero at d.c.

10. The system as in claim 1 wherein said equalizer has a causal step response target, $G_{INT}$, and a causal pulse response target, $F_{INT}$, approximated by:

$$G_{INT}(\omega) = \frac{\cos^n\left(\frac{\pi f}{2f_c}\right)}{j\sin\left(\frac{\pi f}{2f_c}\right) + \frac{\pi f_L}{2f_c}} ; 0 < |f| < f_c$$

$$= 0; |f| \geq f_c$$

$$F_{INT}(\omega) = j\sin\left(\frac{\pi f}{2f_c}\right) G_{INT}(\omega)$$

$$f_L << f_c$$

where $f$=frequency, $f_c$=cutoff frequency given by 1/T where T is the clock period, $f_L$=a frequency inversely related to pulse rise and fall times.

11. The system as in claim 10 wherein said equalizer is a PR2 equalizer and n=2 for use in systems where a substantial portion of the unequalized pulse energy is concentrated within twice the minimum interval between recorded transitions.

12. The system as in claim 6 or 10 wherein said equalizer means has a finite step response at d.c.

13. The system as in claim 6 or 10 wherein said equalizer is a PR1 equalizer and n=1.

14. The system as in claim 1 wherein said equalizer is characterized by poles and zeroes in the transfer function therefor, said transfer function having no poles and zeroes for approximating a (1−D) factor in said partial response polynomial.

15. The system as in claim 1 wherein said approximated partial response polynomial has no (1−D) factor.

16. The system as in claim 1 wherein said modulation code has a maximum accumulated charge of two.

17. The system as in claim 1 wherein said modulation code is a modified R-DAT code having a maximum accumulated charge of three.

18. In a system for storing and retrieving digital data having encoder means for receiving and encoding signals representing said data, an equalizer coupled to said encoder having a pulse response that approximates a $(1+D)^n$ partial response polynomial and is zero at d.c. for producing equalized pulses in response to said encoded digital data.

19. In the system as in claim 18 wherein said digital data is encoded with a d.c. free charge-controlled modulation code characterized by (d, k) run length constraints.

20. The system as in claim 19 wherein said modulation code is further constrained by limiting the run length of code patterns requiring a transition for every clock period.

21. The system as in claim 18 wherein said approximated partial response polynomial has no (1−D) factor.

22. The system as in claim 18 wherein said equalizer is characterized by poles and zeroes in the transfer function therefore, said transfer function having no poles and zeroes for approximating a (1−D) factor in said partial response polynomial.

23. A method for storing and retrieving binary data, said method comprising the steps of:

receiving signals representing said binary data;

encoding said binary data with a d.c. free charge-controlled modulation code characterized by (d, k) run-length constraints;

producing equalized pulses in response to said encoded binary data in accordance with a pulse response that approximates a $(1+D)^n$ partial response polynominal and is zero at d.c.;

detecting said equalized pulses; and decoding said equalized pulses.

24. The method as in claim 23 wherein said step of encoding includes the step of further constraining the modulation code by limiting the run length of code patterns requiring a transition for every clock period.

25. The method as in claim 23 wherein said step of producing equalized pulses further includes the step of producing said equalized pulses in accordance with a step response, $G_{QI}$, and said pulse response, $F_{QI}$, are given by $$G_{QI}(\omega) = \frac{\cos^n\left(\frac{\pi f}{2f_c}\right)}{j\left[\sin\left(\frac{\pi f}{2f_c}\right) + \frac{\pi f_L^2}{2f_c f}\right]} ; 0 < |f| < f_c$$

$$= 0; |f| \geq f_c$$

$$F_{QI}(\omega) = j\sin\left(\frac{\pi f}{2f_c}\right) G_{QI}(\omega)$$

where $f$=frequency, $f_c$=cutoff frequency given by 1/T where T is the clock period and $f_L$=a frequency inversely related to pulse rise and fall times.

26. The system as in claim 25 wherein said equalizer is a PR2 equalizer and n=2.

27. The method as in claim 25 wherein said step response is finite at d.c.

28. The method as in claim 27 wherein said pulse response is zero at d.c.

29. The method as in claim 23 wherein said step of producing equalized pulses includes the step of producing said equalized pulses in accordance with a step response target, $G_{INT}$, and a pulse response target, $F_{INT}$, given by the following equations, respectively:

$$G_{INT}(\omega) = \frac{\cos^n\left(\frac{\pi f}{2f_c}\right)}{j\sin\left(\frac{\pi f}{2f_c}\right) + \frac{\pi f_L}{2f_c}} ; 0 < |f| < f_c$$

$$= 0; |f| \geq f_c$$

$$F_{INT}(\omega) = j\sin\left(\frac{\pi f}{2f_c}\right) G_{INT}(\omega)$$

$$f_L << f_c$$

where $f$=frequency, $f_c$=cutoff frequency given by 1/T where T is the clock period, $f_L$=sample frequency inversely related to the pulse rise and fall times.

30. The method as in claim 29 wherein n=2 for use in systems where a substantial portion of the unequalized pulse energy is concentrated within twice the minimum interval between recorded transitions.

31. The method as in claim 29 wherein n=1.

32. The method as in claim 23 wherein the step of producing equalized pulses further includes the step of characterizing the transfer function of said step by poles and zeroes, said transfer function having no poles and zeroes for approximating a (1−D) factor in said partial response polynomial.

33. The method as in claim 23 wherein said approximated partial response polynomial has no (1−D) factor.

34. The method as in claim 23 wherein said modulation code has a maximum accumulated charge of two.

35. The method as in claim 23 wherein said modulation code has a maximum accumulated charge of three.

36. In a method for storing and retrieving digital data having the steps of receiving and encoding signals representing said data, further including the step of producing equalized pulses in response to said encoded signals in accordance with an equalizer pulse response that approximates a $(1+D)^n$ partial response polynomial and is zero at d.c.

37. In the method as in claim 36 wherein said step of encoding includes the steps of encoding with a d.c. free charge-controlled modulation code characterized by (d, k) run length constraints.

38. The method as in claim 37 wherein said step of encoding includes the step of further constraining said modulation code by limiting the run length of code patterns requiring a transition for every clock period.

39. The method as in claim 36 wherein said approximated partial response polynomial has no (1−D) factor.

40. The method as in claim 36 wherein said step of producing equalized pulses further includes the step of characterizing the transfer function of said step by poles and zeroes, said transfer function having no poles and zeroes for approximating a (1−D) factor in said partial response polynomial.

* * * * *